(12) United States Patent
Bentley et al.

(10) Patent No.: US 9,292,814 B2
(45) Date of Patent: Mar. 22, 2016

(54) SYSTEM AND METHOD FOR CONCURRENT ELECTRONIC CONFERENCES

(75) Inventors: Jon L. Bentley, New Providence, NJ (US); Anjur S. Krishnakumar, Princeton, NJ (US); Parameshwaran Krishnan, Basking Ridge, NJ (US); Navjot Singh, Denville, NJ (US); Shalini Yajnik, Berkeley Heights, NJ (US); Kirak Hong, Atlanta, GA (US)

(73) Assignee: Avaya Inc., Basking Ridge, NJ (US)

( * ) Notice: Subject to any disclaimer, the term of this patent is extended or adjusted under 35 U.S.C. 154(b) by 728 days.

(21) Appl. No.: 13/426,726

(22) Filed: Mar. 22, 2012

(65) Prior Publication Data

US 2013/0254279 A1    Sep. 26, 2013

(51) Int. Cl.
*G06Q 10/06* (2012.01)
*G06Q 10/10* (2012.01)
*H04N 7/15* (2006.01)
*H04L 12/18* (2006.01)

(52) U.S. Cl.
CPC ...... *G06Q 10/06311* (2013.01); *G06Q 10/1095* (2013.01); *H04L 12/1827* (2013.01); *H04N 7/15* (2013.01)

(58) Field of Classification Search
USPC ............................................................ 707/7
See application file for complete search history.

(56) References Cited

U.S. PATENT DOCUMENTS

| | | | |
|---|---|---|---|
| 8,121,953 B1 * | 2/2012 | Orttung et al. ............... | 705/52 |
| 2004/0078255 A1 * | 4/2004 | Demsky et al. .................. | 705/8 |
| 2006/0026052 A1 * | 2/2006 | Klett et al. ........................ | 705/8 |
| 2006/0224430 A1 * | 10/2006 | Butt ................................. | 705/8 |
| 2007/0288278 A1 * | 12/2007 | Alexander et al. ............... | 705/8 |
| 2008/0065447 A1 * | 3/2008 | Evanchik et al. ................. | 705/8 |
| 2008/0288316 A1 * | 11/2008 | Chakra et al. .................... | 705/8 |
| 2009/0157469 A1 * | 6/2009 | D'Urso et al. .................... | 705/9 |

(Continued)

FOREIGN PATENT DOCUMENTS

EP        0644510 B1    3/1995

OTHER PUBLICATIONS

Modi et al., Multiagent Meeting Scheduling with Rescheduling, Proceedings of the Fifth Workshop on Distributed Constraint Reasoning (DCR 2004), Toronto, Canada, Sep. 2004, http://idea.library.drexel.edu/handle/1860/817, 15 pages.

(Continued)

*Primary Examiner* — Natisha Cox
(74) *Attorney, Agent, or Firm* — Maldjian Law Group LLC

(57) ABSTRACT

Method for scheduling and implementing an electronic meeting conducted among remotely-located users communicating with an agenda server, including: accepting a meeting agenda that includes a plurality of topics, a quorum, an identification of resources used by each topic, an identification of data used by each topic, and an identification of data produced by each topic; partitioning the meeting agenda into at least a first and second group of topics; searching for data dependencies between the first and second groups of topics; searching for resource dependencies between the first and second groups of topics; if data dependencies or resource dependencies are found between the first and second groups of topics, then repartitioning the meeting agenda until the data dependencies and resource dependencies between the first and second groups of topics are reduced below a predetermined dependency threshold; and concurrently scheduling and executing the first and second groups of topics.

10 Claims, 3 Drawing Sheets

(56) References Cited

U.S. PATENT DOCUMENTS

2009/0271438 A1\* 10/2009 Agapi et al. ............... 707/104.1
2010/0088144 A1\* 4/2010 Collet et al. ...................... 705/9
2010/0318399 A1\* 12/2010 Li et al. ............................ 705/9
2012/0140681 A1\* 6/2012 Kaminsky et al. ............ 370/261
2012/0191501 A1\* 7/2012 Olliphant ..................... 705/7.19
2013/0060593 A1\* 3/2013 Motoyama ................... 705/7.19

OTHER PUBLICATIONS

Sen et al., A Formal Study of Distributed Meeting Scheduling, Group Decision and Negotiation 7: 265-289, 1998 © 1998 Kluwer Academic Publishers. Printed in the Netherlands, 26 pages.

\* cited by examiner

SYSTEM AND METHOD FOR CONCURRENT ELECTRONIC CONFERENCES

BACKGROUND

1. Field of the Invention

Embodiments in accordance with the present invention pertain to concurrent electronic conferences and, in particular, a system and method to schedule and conduct concurrent electronic conferences.

2. Description of the Related Art

Meetings are often used in a professional or educational setting to disseminate information, such as via a setting such as a lecture, a talk, and so forth. The setting may be organized as a one-to-many meeting (e.g., a professor lecturing to students in a lecture hall), many-to-one (e.g., a briefing by several team members to one executive), or a mixed scenario (e.g., a panel discussion that includes both prepared remarks and a question and answer session).

Meetings may also be used to stimulate information and further discussion. For instance, discussion among researchers of a problem may stimulate identification of additional approaches to solve the problem.

Conduct of meetings can be facilitated via a meeting agenda. The agenda will generally help plan a meeting by identifying the topics to be discussed, and identify assigned participants for the topics and the roles or credentials of the assigned participants. The agenda may help participants and other meeting attendees to prepare for the meeting, making the meeting more productive as judged by information exchanged, decisions reached, and so forth. The agenda is useful to guide participants regarding the goals of the meeting and identify when the meeting may be straying from achieving the goals. Therefore, the agenda is a useful tool to help manage the meeting and make efficient use of the attendees' time.

A meeting agenda generally comprises a list of several topics, and the list is used to stimulate agenda-driven topic discussions. The topics may differ in the number and/or identity of preferred or required participants. Furthermore, a single participant may have different roles for different topics (e.g., a presenter for one topic, but a decision maker for another topic).

The meeting schedule may change dynamically during the course of a meeting. For instance, participants' schedules may change during a meeting. The agenda may be shuffled such that topics are moved around in the schedule, or added, deleted, or combined with other topics.

Meetings often include concurrent discussions. For instance, a complicated problem may include one or more subcommittees to study the problem or aspects of the problem in greater detail, after which the subcommittee is charged with a duty to report findings and recommendations to the full meeting. For example, at a standards meeting, subcommittees may be formed to study the relative technical merits of various proposed alternative solutions. Subcommittees may have their own agendas and quorum requirements apart from the agenda and quorum for the meeting as a whole. Subcommittees offer the opportunity for the meeting as a whole to benefit from the expertise and in-depth study provided by the participants of the subcommittee, without unduly using resources of the meeting attendees as a whole.

Various scheduling processes for generic meeting scheduling problems are known in the art, but the known processes suffer drawbacks. For example, the known processes consider meetings as independent events rather than fully considering interdependencies. Furthermore, the known processes do not address dynamic changes during meetings.

Agenda planning, meeting management, and the meeting itself can be assisted by or conducted via on-line tools. Examples of available tools include OpenMeetings, Avaya Web Conferencing System, Persony, web.alive, WebEx, Big Blue Button, and IDEAL Conference.

OpenMeetings is an open-source browser-based software application that allows a user to quickly set up a conference via the Internet. A user can use a microphone or webcam, share documents on a white board, share the computer screen and record meetings. OpenMeetings is available as hosted service or can be downloaded and installed on a server with substantially no limitations in usage or users.

OpenLaszlo is an open-source platform for development and delivery of multimedia-rich Internet applications. OpenLaszlo applications can be deployed as Java servlets, which are compiled and returned to the browser dynamically. This method requires that the web server is also running the OpenLaszlo server. Alternatively, OpenLaszlo applications can be compiled from LZX into DHTML or a binary SWF file, and loaded statically into an existing web page. This method is known as SOLO deployment. Applications deployed in this manner may lack some functionality of servlet-contained files, such as the ability to consume SOAP web services and Java RPC remote procedure calls.

Avaya Web Conferencing System allows users to set up an online data conference, in which users can communicate using a range of methods. Data conferencing, audio conferencing, and video conferencing are supported.

Persony web-based conferencing is a web and video conferencing application. Users can share a desktop display, give a sales presentation, see others using high-definition webcams, or conduct a webinar, all from a private web conferencing site. Participants can join a meeting via substantially any web browser and computer.

Avaya "web.alive" is an online subscription-based conferencing service that can be used for hosting meetings, leading training sessions, and so forth. A host subscription includes features needed to engage an audience online, and offers high-definition positional voice, file sharing, presentations, desktop sharing, co-browsing, avatar customization, web integration, self administration, etc.

Cisco WebEx is a web conferencing product that lets participants connect with other persons online in real time. WebEx combines desktop sharing through a web browser with phone conferencing and video, so participants see the same thing while a host conducts the conference.

Big Blue Button is an open source web conferencing system built using open source components in order to create an integrated solution that runs on a plurality of computing platforms.

IDEAL Conference is a product that integrates data and voice within standard web browsers. IDEAL Conference enables people to conduct meetings over the Internet from a computer with a network connection and a web browser.

A drawback of the known art is that they do not adequately support the interactions found in electronically-assisted meetings. For instance, there is little or no notion of agenda and topics. A moderator manually handles meeting dynamics (e.g., keeping the meeting focused and on-schedule), and concurrent discussions are handled manually by arranging for multiple meetings. Furthermore, existing web conferencing products make inefficient use of the participants' time. For example, a person who desires to participate in a portion of a meeting (e.g., a conference, public meeting, or the like) but who does not need to attend the entire conference generally has two options. First, the person can attend the entire meeting from start to finish. This will unnecessarily waste the person's time as topics are discussed that have little or no interest to the person.

Second, the person can estimate from a published agenda or the like when topics of interest will be discussed, and attend the meeting during the estimated times, with or without some buffer time for expected variations between the published agenda and an actual pace of the meeting. Disadvantages of this approach include that the actual pace of the meeting may differ from the published agenda, resulting in missing topics if the pace is quicker than expected and exceeds any built-in buffer time, or unnecessarily waiting if the pace is slower than expected and thereby wasting time. Or, the topics may be discussed out of order from the published agenda, which again results in missing topics.

Furthermore, in a large meeting, there may be topics that are of interest to non-overlapping groups of attendees. The overall meeting time can be shortened and concurrency improved by scheduling concurrent breakout sessions. Such breakout sessions may be scheduled in advance or scheduled in an ad-hoc manner, such that the breakout sessions are scheduled to start at around the same time, and scheduled to end at around the same time. A disadvantage of this approach is that it may be difficult to schedule breakout sessions having roughly equal length and appealing to substantially non-overlapping sets of attendees. The resulting subject matter division among the breakout sessions may be very granular, thereby reducing the achievable gain from the concurrency of the breakout sessions.

Therefore, a need exists to provide improved subject matter scheduling in a meeting and, in particular, for an improved system and method to schedule and conduct concurrent electronic conferences.

SUMMARY

Embodiments in accordance with the present invention improve the subject matter scheduling in a meeting and, in particular, allowing a person who desires to participate in, for example, a portion of a meeting (e.g., a conference, public meeting, or the like) but who does not need to attend the entire conference, to utilize their time more efficiently by reducing the overall meeting time and by reducing the amount of wasted time, and by improving the probability that they will be present for a topic of interest, while reducing the probability that they will not be in attendance for a topic of interest.

Embodiments in accordance with the present invention may provide a method for implementing an electronic meeting, wherein the electronic meeting is conducted among remotely-located users via one or more communication links with an agenda server, the method comprising the steps of: accepting, by the agenda server, a meeting agenda comprising: a plurality of topics; an identification of resources used by each topic; an identification of data used by each topic; an identification of a quorum for each topic; and an identification of data produced by each topic; assigning topics to at least a first group of topics and a second group of topics, such that there are no data dependencies or resource dependencies between the first group of topics and the second group of topics; and concurrently scheduling the first group of topics and the second group of topics.

Embodiments in accordance with the present invention also include an ability to provide a meeting snapshot (i.e., an electronic "peek" at the meeting status at a selected time). The electronic peek may be used in order to electronically provide in a controlled way a current status of the meeting, and/or what topics have been discussed, attendance, upcoming agenda items, and so forth.

Optionally, the system may further include a memory coupled to the processor, the memory configured to store instructions such that, when the instructions are performed by the processor, the processor performs the steps of implementing an electronic meeting, wherein the electronic meeting is conducted among remotely-located users via one or more communication links with an agenda server, the method comprising the steps of: accepting, by the agenda server, a meeting agenda comprising: a plurality of topics; an identification of resources used by each topic; an identification of data used by each topic; an identification of a quorum for each topic; and an identification of data produced by each topic; assigning topics to at least a first group of topic and a second group of topics, such that there are no data dependencies or resource dependencies between the first group of topics and the second group of topics; and concurrently scheduling the first group of topics and the second group of topics.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments encompassed within the scope of the present invention, and, therefore, are not to be considered limiting, for the present invention may admit to other equally effective embodiments, wherein.

Figure 1:
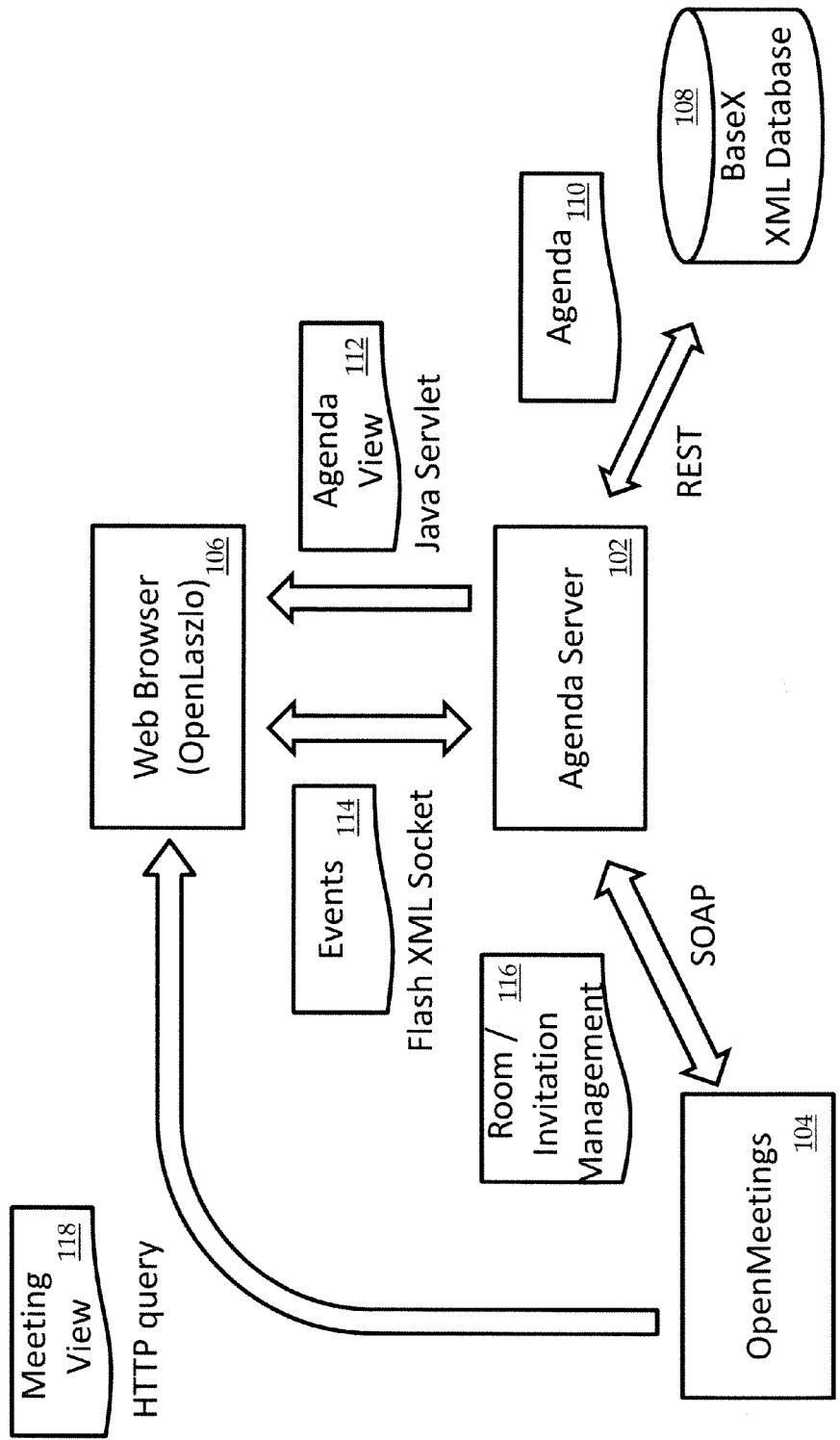
FIG. 1 illustrates a schematic view of system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines.

DETAILED DESCRIPTION

Embodiments in accordance with the present invention target opportunities for making meetings shorter, more effective, and more relevant to the attendees by automatically exploiting concurrency inherent in the agenda of a meeting. This approach provides more efficient meetings by: integrating an agenda into an e-conference system; transforming an agenda into actual meeting minutes; provide for dynamic meetings in which agenda items can be added, deleted, moved, combined, and/or divided; handling the dynamics in an automated manner; providing enhanced user control of the meeting dynamics; and providing for and managing concurrent meetings. All of this may result in more effective and more efficient e-conferences.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "meet" or "meeting" refers to a communication session, generally at a pre-arranged time. The meeting may be conducted in person, or may be conducted electronically. As used herein, "conference" and "meeting" are used interchangeably unless a distinct meaning is indicated otherwise, either explicitly or clearly in context.

Many meetings are inherently sequential. For such meetings, substantially every attendee of the meeting is required to receive some information, or provide some input. Therefore they all participate at the same time. Some meetings, in which one or more key decision-makers (e.g., a boss, a town council meeting, etc.) must receive some information, take action, and/or approve of action, are also inherently sequential.

Some contexts, though, allow for concurrency: two or more topics can be addressed at the same time. This is most often seen when committees meet at the same time to address different issues that converge on the same problem. For example, if an organization has a need to reduce its budget across the board, the individual departments may meet in parallel to plan budget cuts within their departments. Or, in the context of technical conferences, sessions having substantially non-overlapping subject matter can be identified (e.g., for a conference devoted to communication technology, a session devoted to RF methods and a session devoted to optical methods; or a session devoted to customer service and a session devoted to new business development), and participants can self-select which session to attend.

Information developed or presented at meetings may be transferred by other more efficient methods than a meeting. For instance, information to be distributed may be placed on the web, and a relevant person may be instructed to access it, and a verification method such as auditing or self-acknowledgment that the information was viewed. Other information might be collected from many sources without gathering together all attendees.

However, some meetings are more effectively conducted by having an interactive participation among a number of attendees, but do not require all attendees of the meeting to participate. Embodiments in accordance with the present invention provide that such meetings take place in parallel and provide a concurrency of agenda items. Such concurrency may make the overall meeting shorter, more efficient and more effective because sub-meetings are attended only by relevant parties, while other attendees are able to participate in other activities more relevant to the attendee or the organization. Furthermore, some embodiments in accordance with the present invention may also provide more efficient and more effective meeting by providing a "peek" capability, such that attendees can determine more precisely when their attendance is needed, and attend meetings or sub-meetings only closer to or when their attendance is needed.

Understanding data dependencies is important in implementing concurrent meetings. No meeting can run more quickly than the longest chain of dependent resources (e.g., decision-makers, required attendees, etc.), since actions that depend upon prior actions in the chain must be made in proper sequence. However, most meeting do not involve just a long chain of dependent resources and actions; there are usually opportunities to execute independent actions in parallel.

Data dependency is an issue in being able to exploit concurrency that is inherent to meetings. During the implementation of a process to subdivide a meeting agenda, data dependency between two side sessions may involve access to information developed from one side session, or decisions made in the one side session, in a second side session. Further dependencies imply further access time or more inter-session communication in case of exploiting concurrency. This, accordingly, degrades the ability to increase the amount of concurrency. Thus, it is important to study and analyze data dependencies in a process to exploit concurrency in a meeting. Issues include: how to reduce block or side session dependencies; how to reduce access time to key persons in the meetings; and the impact of side session dependencies in being able to exploit meeting concurrency.

Detection of opportunities for concurrencies involves finding sets of agenda items that can be performed simultaneously. The approach to concurrency is based on the study of data dependencies. Embodiments in accordance with the present invention may take into account any number of relevant data dependencies, such as availability of key persons or key facilities. Embodiments in accordance with the present invention may provide an incremental approach to determining dependencies. For example, a system in accordance with an embodiment of the invention may start by assigning key persons to topics and determine an attendance status of the key persons. The embodiments may then consider a next constraint (e.g., if the purpose of the meeting is to consider a capital expenditure, then allocating a budget for the expenditure may be a prerequisite to selecting an item to purchase or its optional features). The embodiments may then consider additional constraints to concurrency (i.e., parallelism) based upon data dependencies. The presence of dependence between two agenda items implies that they cannot be performed in parallel. In general, the fewer the dependencies, the greater the parallelism.

Automation of meeting dynamics may involve usage of metrics to determine scheduling. Scheduling in a simple form may be considered a process of choosing which of a plurality of topics should be addressed first. Scheduling in a more complex form may be considered a process of analyzing multiple permutations of the topics. The processes used to perform scheduling will attempt to satisfy all constraints in a way that tends to maximize an overall measure of merit. Specific scheduling metrics may include the overall time length of the meeting or sub-meeting, the average meeting time for participants, and so forth. Scheduling metrics may also take into account a weighting of the importance of the time of certain participants. For instance, an executive's time (e.g., that of a CEO, CTO, etc.) should be minimized, whereas if certain participants have a personal interest in the subject matter then they can be allocated or scheduled a greater amount of meeting time on their personal schedule, thereby maximizing an overall interest factor subject to personal schedule and interests on various topics. Personal interests may be determined by polling participants for a ranking on a predetermined scale (e.g., a scale of 0 to 5). Automation of meeting dynamics may also provide delayed rescheduling for real-time updates.

As a meeting takes place, meeting status can be tracked and made available to attendees, including key persons, by use of a "peek" capability. Upon peeking, an attendee can more accurately estimate when their presence is needed in the meeting. Peeking is described in greater detail Some types of meetings may comprise repetitions of certain processes or subject matter, i.e., discrete agenda items that may have internal data dependencies but not data dependencies that span across other agenda items. For example, some organizations are chosen such that the Budget Committee and the Membership Committee have no overlap, so their meetings may be scheduled in parallel. Such concurrencies can be identified and exploited relatively easily. However, there are meetings for which dependencies vary from one agenda item to another, and these meetings are more difficult to analyze, but still tractable. When two or more agenda items have similar dependencies, it means that they exhibit similar parallel properties.

Some types of meetings may be so intertwined, in light of the agenda, that no advantage can be gained by conducting the meeting concurrently.

Examples of Concurrent Meetings

Committee Reports. In many organizations that adhere to Robert's Rules of Order, committee reports are read to the complete assembly. In some contexts, those reports may simply be passively posted on a web site, etc., in order to save time. But passively allowing access to the information does not ensure scrutiny of the information by the appropriate audience. Embodiments in accordance with the present invention can improve efficiency, while providing a greater level of scrutiny, by discussing several reports concurrently in side sessions, while ensuring that each report is presented to an appropriate quorum in the side session.

A Lecture with Group Discussions. A first half of a training session includes a lecture that one person gives to 100 attendees. A second half of the training session includes ten group discussions of ten people each. The groups may be chosen statically beforehand (e.g., for uniformity or diversity across geography or functional groups), or dynamically (e.g., after taking a brief online quiz, discussion groups may be formed to reinforce the areas where attendees had difficulty; or if attendees may have different foci of interest, such as customer support training sessions for different product lines).

An Evaluation Committee. For example, a group of twenty members may be assigned the task of selecting a predetermined number of submissions and rejecting the rest of the submissions. Examples of submissions may include: papers for a technical symposium; new ideas at a suggestion box; new business proposals; or invention disclosures for further consideration. The evaluation committee may initially convene in full to discuss the threshold or overall goal of the committee (e.g., to accept about ten of the thirty submitted papers, etc.). Thereafter, the full committee may be divided into a plurality of subcommittees, each to discuss a subset of the submissions that were assigned to the subcommittee. Each subcommittee ranks their assigned submissions according to a predetermined scale (e.g., "probable accept," "probable reject," and "undecided"). Subcommittee members may use a "peeking" capability to determine more precisely when their attendance is needed at subcommittees that are high priority or of more interest, so that members can attend subcommittees of lower priority or lower interest if they so choose. When an initial phase of the work of the subcommittees has concluded, the entire evaluation committee may reconvene to report their status (e.g., how many submissions assigned to each category). The subcommittees may then reconvene for additional ranking, taking into account information from the full committee before reaching a conclusion within the subcommittee and defending that decision to the full committee.

Embodiments in accordance with the present invention provide a system that starts with an initial agenda, and keeps track of who is present at all times. For e-conferences, tracking attendance can be implemented by the web conferencing tool used to host the e-conference. For physical conferences, tracking attendance may be implemented by use of RFID chips, for instance an RFID chip embedded within a badge issued to participants at a physical conference. The agenda allows dynamic electronic conferences ("e-conferences") to change easily in response to unforeseen conditions, such as the level of interest by participants, or the availability of participants. The single agenda allows concurrent sub-conferences to have topics discussed in parallel. Both the dynamic and concurrent features are facilitated by the agenda. The agenda facilitates dynamic and concurrent features because the agenda states what is needed for each topic to be discussed, such as people who should participate in the topic discussion, and previous topics. Embodiments in accordance with the present invention provide a process that examines the current agenda and attendance list, both of which may be dynamically modified to reflect what has been discussed in the meeting so far and to reflect who has entered or left the meeting, and then reports what topics are ready for discussion. The report of what topics are ready for discussion may be provided to participants by way of the peeking capability described herein. A similar process may search for and report opportunities for concurrent discussion. Dynamic and concurrent features may be implemented independently, but they become more responsive to participant interest and availability when the dynamic and concurrent features are used together. Concurrency may be relatively more useful in large meetings that have more opportunities for concurrency, thereby making those conferences shorter.

Technical Details

Embodiments in accordance with the present invention provide a system that starts with an initial agenda. The agenda comprises a sequence of topics with associated properties such as discussion times and required participants. The system keeps track of who is attending the meeting at all times, e.g., via a web conferencing tool hosting the e-conference. Each topic has a pre-determined quorum, which may be as few as only a topic leader. The quorum may identify additional specific required attendees, or just identify a minimum number of attendees. More complex quorum requirements may be accommodated, such as "at least two members of a first committee, and three members of a second committee." Topics may also have "topic dependencies" (such as a "prerequisite topic"), for example a "budget" topic may have to be discussed before discussing a "new expenditures" topic. In another example of a topic dependency, decisions may have to be made in one topic (e.g., an executive topic) and the resulting decisions carried out in another topic (e.g., a scheduling topic). Topic dependencies may also include data dependencies, people dependencies (e.g., a simple list or a complex quorum rule), previous topics, key documents, and explicit approvals (e.g., in order to discuss a particular topic, a document needs to be completed and signed).

Two or more topics can be discussed concurrently if they have non-overlapping quorums and have no topic dependencies, i.e., if neither topic depends on the other. There are at least two approaches to generating concurrency: searching for concurrency that is inherent in a particular agenda, and manufacturing concurrency intentionally, for instance by rearranging the agenda. A process that identifies concurrency should at least identify data dependencies between topics, and identify a list of the required presence of key attendees for giving or receiving information. Data dependencies may also include for each topic an identification of key persons who need to be present (i.e., quorum rules) and key persons authorized to make decisions. Quorum rules may be complex, for instance a quorum rule may be "we must have Persons A, B and C, at least one person from committees D, E and F, and a total of 9 people."

At some point when there is insufficient concurrency, the overhead involved in searching for concurrency and setting up concurrent meetings may overtake any savings gained from concurrency. For instance, one would not likely try to set up concurrent meetings that last just one minute. In some embodiments, concurrent meetings may not be set up if they involve too few participants or would result in too many concurrent meetings. Embodiments in accordance with the present invention include heuristics to determine whether a potential gain from concurrency is (or is not) enough to satisfy the effort and overhead to set it up. For example, a fixed overhead may be included to account for the time spent splitting off into a sub-meeting (e.g., three minutes), and another fixed overhead to account for the time spent rejoining the main meeting (e.g., two more minutes). Other time penalties may also be included, e.g., a four minute penalty to account for a loss of productivity as participants mentally shift their mindset from one submeeting topic to another submeeting topic. A process in accordance with an embodiment of the invention would then partition a topic into concurrent subtopics only if the benefit exceeds the cost.

A process to search for concurrency can compare all topics in an agenda. The process may start with identifying topics that can be discussed in parallel without modification. For example, if the people required for topic "A" and topic "B" are entirely disjoint (i.e., non-overlapping), then topic "A" and topic "B" can be conducted in parallel. However, if the quorum is given in terms of "one person from a first committee" and "one person from a second committee," then the process may partition the meeting and concurrently schedule topic "A" and topic "B."

If two topics both have met all prerequisites (e.g., topics, decisions, and availability of data that will be needed during discussion of the topics) and have a non-overlapping set of required attendees and no dependencies on data or decisions, then those two topics may be discussed in parallel as concurrent topics in sub-sessions. Embodiments in accordance with the present invention may provide an ability to suggest changes to the agenda, and the moderator can approve the changes to the agenda. The required participants may then be placed in the sub-sessions, and non-required meeting attendees can choose to attend the sub-session or to stay in the current meeting. Embodiments in accordance with the present invention provide an efficient process for detecting and exploiting such parallelism. Changes to the agenda may be reported to participants as part of the peeking process described herein.

Manufacturing Concurrency. In some meetings, a leader may wish to divide a large main group into subgroups. In this situation, the leader identifies the topics that have no mutual dependencies (e.g., personnel, data, or decision dependencies), and the leader assigns key people to each topic, and may appoint a leader of the subgroup. Assignation of persons to a topic may include an indication of the requiredness of an identified person, i.e., an indication of how much that participation by the identified person is either required desired. For instance, some persons may be essential, whereas other persons may be preferred and yet other persons on a "for your information (FYI)" basis. Requiredness may also be indicated on a scale, e.g., a scale from 1 to 5. Quorum may include threshold attendance levels by each level of requiredness, for instance all persons identified as essential, at least 50% of persons identified as preferred, and no minimum on the number of FYI persons.

FYI persons may include persons who are able (but not required) to join a topic, based upon their personal interest. A computer-implemented system to maintain the agenda topics may include controls that facilitate dividing the large group into subgroups in this manner. Such a system may also include a control or an ability by the leader of a subgroup to merge the subgroup back into the main group. The topics may include a single topic in which the leader sees two distinct subtopics, or two topics that the leader feels have little or no overlap. For example, the Lecture with Group Discussions and the Evaluation Committee referenced earlier both may be subject to a manufactured concurrency. A peeking capability as described herein may be useful to FYI persons who may also be essential persons for another topic. Such FYI persons may attend the FYI topic while using "peeking" to monitor progress of another topic, and then leave the FYI topic when the person's attendance at the other topic is closer to being needed.

Compliance with quorum may be monitored dynamically, providing a dynamic quorum compliance monitoring with an attendance status set either explicitly (e.g., a "check-in" and/or check-out" control), or inferred by a level of activity (e.g., active participation by spoken or written actions; accessing resources under discussion within the topic; activating a positive confirmation of activity, such as "click here to continue" or "logoff for inactivity in one minute", etc.). The meeting moderator may be warned if the attendance as determined by the dynamic quorum compliance monitoring drops below quorum.

Nature of Venue. "Venue" as used herein may refer to either a physical venue for a conference, or refer to a virtual context for an e-conference. The virtual context may host the e-conference via a telephone bridge, a textual chat room, a set of video streams or the like. In some cases, a small subcommittee of a major e-conference may be spun off into a new venue, while the remainder of the major e-conference continues in its original venue. In other cases, sub-sessions of a major conference may be assigned to new sub-venues, while the original meeting venue is maintained as a meeting place when the sub-sessions have completed their work. In yet other contexts, the original venue may be closed or dissolved, and only the sub-venues are available. Which choice is appropriate is a policy choice that can be parameterized in a system, and presented to a user as a menu of choices to select among or to enable.

Manual Override. Embodiments in accordance with the present invention can be designed to reflect a variety of policies regarding the process of scheduling concurrent meetings and/or the weighting given to various considerations. One policy may involve an aggressiveness factor used to determine how aggressively to try to exploit concurrency, with choices such as: (a) allow no concurrency at all; (b) suggest concurrency but don't enforce it; (c) attempt to induce as much concurrency as possible; or (d) mandate all possible concurrency. Other policies may decide issues such as which participants go to which meetings. A policy may be manually overridden by users with appropriate permissions, such as a meeting organizer.

Advanced Criteria. Embodiments in accordance with the present invention are able to identify candidate pairs of concurrent topics. Embodiments may further perform more complex analysis, such as identifying concurrency among three or more topics. The system may then attempt to organize an entire meeting to meet various optimization criteria, such as minimizing total duration time, or by calculating a sum of times weighted by an importance value of the participants, while not exceeding a maximum concurrency. Such optimization may be performed once, before a static concurrent meeting, or many times throughout a dynamic concurrent meeting.

Tracking Meeting Progress. Tracking the progress of static meetings (i.e., meetings with a fixed agenda) is straightforward. However, tracking the progress of a dynamic meeting is more subtle and harder. Each sub-session may be progressing at a different rate, and the sub-sessions may represent unequal shares of the overall agenda. This may influence an ability to change the order in which topics are discussed. For example, in a conventional static meeting, a participant may be able to know that the meeting is in the middle of item 7, and that therefore the previous agenda items (i.e., items 1-6) are finished and that subsequent items (i.e., items 8-17) are unfinished. In a dynamic meeting, a participant may know that the meeting has finished items 1, 2, and 3, then moved on to 7, finished half of that, and then moved back to 5. In a conventional meeting, a bookmark may represent a single number (i.e., the current agenda topic). In a dynamic meeting, a bookmark may represent a list of topics that have been finished and topics that are unfinished.

Embodiments in accordance with the present invention provide tools for presenting the meeting progress to users in different ways, or measuring the meeting progress in different ways. For instance, progress may be measured by the number of agenda items resolved. Or progress may be measured by comparing the actual amount of time spent for an agenda item to the amount of time that the agenda item was estimated to take. The user interface may include graphical forms in order to see the overall structure of the meeting. Color may be used, for instance red for meetings behind forecast, and green for meetings on-time. Meeting progress may be presented to a participant as part of a "peeking" process described herein.

Embodiments in accordance with the present invention include a system that provides an integrated agenda and topic management. In the agenda model, an agenda is a collection of topics, together with the required or desired participants for each topic. Participants may also be referred to herein as attendees. Participants may be ranked to indicate how important their presence or participation is to meaningfully address the topic. Topics include an indication of dependencies between different topics, and the participants required or desired for each topic.

Embodiments in accordance with the present invention provide a system that helps automate agenda planning. The system can help write an agenda from scratch, and can provide an instant agenda setup and plan ahead. The system may also provide a view of the progress during the meeting of addressing topics on the agenda. The view may be by way of the peeking process described herein. Meeting progress may be inputted into the system by moderator control, e.g., by the moderator activating a "finish topic" or "next topic" button. Progress can be visually displayed in order to more easily convey the status of the meeting or sub-meetings thereof.

In embodiments of the integrated agenda and topics model of the present invention, participants may have different roles for different topics. A first role is that of a topic leader, who has authority to finish topics, i.e., to declare the topic finished. The topic leader may also spawn new topics if so deemed by the subcommittee. Initial quorum and data dependencies of a new topic may initially be empty, or the new topic may inherit those attributes from its parent topic. Another role is that of the minute taker who generates the minutes for each topic. There may be one dedicated official note taker (e.g., a meeting secretary). Alternatively, the meeting could be opened up to let anyone take notes. The notes may be opened up without restrictions, or the notes may be restricted to only open them to certain people. Another role is that of a moderator, who generally will guide a discussion forward toward consensus and/or decisions. A single person may act in more than one role. Other types of roles may also be available or used. In some contexts the topic leader may concentrate on the topic itself, while the moderator might hurry things along or slow things down, or point out that a particular person has not been heard yet, etc.

Embodiments of the integrated agenda and topics model of the present invention may further support topic history, for instance by assisting in relating the contents of active discussions with topics from the agenda. For example, embodiments in accordance with the present invention may provide a system to deduce when a topic has changed, either by pauses and word analysis, or be looking for a keyword (such as "next"). The contents may include notes, chat history, audio or visual recordings, a record of votes taken, etc. By relating contents to topics in this way, embodiments in accordance with the present invention are able to provide better context tracking, i.e., a more thorough description of the background of a discussion or explanation of how decisions were arrived at. The topic history will become a part of the meeting minutes.

Embodiments in accordance with the present invention also assist in the automation of meeting dynamics. Dynamics, as used herein, may refer to changes in the schedule. Changes may arise from external events that affect the schedules of individual participants, such as last-minute additions or cancellation of other, unrelated meetings. Changes may also arise as a result of discussions within the sub-session, e.g., it may become apparent the additional topics are needed or some previously-scheduled topics are moot, based upon the outcome of discussions during the sub-session. There may also be topic overflow and/or topic underflow. Overflow is when a topic is running too long (e.g., a 10-minute topic lasts for 20 minutes), and underflow is when a topic is running too short (e.g., a 10-minute topic lasts for 5 minutes).

Embodiments in accordance with the present invention include an improved process for topic and meeting scheduling. In one embodiment, a "greedy" process is used, in the sense that the process will select the best choice at the time of selection (e.g., a local maximum), with little or no look-ahead for a maximum over a wider field of selection (e.g., a global maximum). In such an embodiment, instead of trying to find the optimal permutation of all topics, the greedy method first chooses the best among all current topics, then the best topic among the remaining topics, and so forth. That might not be as good as considering all the future consequences. In this process, a topic starts if dependencies among topics are resolved, resulting in a preliminary schedule, order, ranking, or the like among topics. Also, quorum requirements (i.e., attendance policies) for the topic have to be satisfied, for instance if three out of four panel members are present. A topic may be finished or closed by either the topic leader, or by consensus among the participants of the sub-meeting. The quorum requirement may be set by the topic chairman and/or other members of the subcommittee. An attendance policy may be either required or optional, and it may also apply to representatives from a set of committee.

Other embodiments of dividing an agenda into multiple concurrent topics or meetings may be used. For example, a simple approach is to consider all subsets in order, i.e., every combination or permutation of grouping the topics into two or more concurrent topics. The simple approach leads to a process having an exponential running time, i.e., the running time increases exponentially with the number of topics and/or concurrent sessions to consider. However, the simple process may be feasible if the number of topics is small. More advanced processes may have less than exponential running time.

Another embodiment of dividing an agenda into multiple concurrent topics or meetings may be to start with two or more empty groups of topics. A first subtopic is assigned to the first group. For each subsequent topic, sort the groups of topics into a list sorted by increasing agenda length, i.e., after sorting the first group on the sorted list will have the shortest agenda. Then assign the subsequent topic to the group having the shortest agenda and which would have no resource conflict or data conflict at that time. For example, suppose there are three groups of topics (A, B, C) and assigning the subsequent topic to group A of the sorted list would produce a resource conflict with group B, then the subsequent topic may be assigned to group B if there would be no resource or data conflict with group C. However, if assigning the subsequent topic to group B would produce a resource conflict with group C, then the subsequent topic would be assigned to group C. The assignment of the subsequent topic to a group of topic may be by scheduling the subsequent topic at the end of the group's agenda or may be by scheduling the subsequent topic at a point not at the end (e.g., inserted in the middle of the agenda so long as there is no conflict with other groups of topics at that time). This process is repeated for each topic.

Another embodiment of dividing an agenda into multiple concurrent topics or meetings may be to bin-pack the topics into two or more proposed groups of topics. If resource dependencies or data dependencies exist among the proposed groups of topics, the agenda order of one or more groups of topics may be permuted to try to resolve the resource or data dependency. If no permutation of any of the group(s) of topics produces a conflict-free concurrent meeting agenda, then a topic from one group of topics may be reassigned to another of the groups of topics, and the groups would be reanalyzed for resource or data dependencies.

Embodiments in accordance with the present invention provide user control of dynamics, wherein the user may be any of the persons or roles discussed above, e.g., the organizer, moderator, discussion leader, lecturer, etc. For example, a lecturer might decide that even though the next topic is "A," the discussion will move to "K" instead because of interest by attendees. Examples of dynamics that can be controlled may further include topic notification, identification of backup participants, and dynamic agenda modification. Embodiments in accordance with the present invention may attempt to meet the constraints and maximize a satisfaction function. A manual override (e.g., an override of topic changes) may also be provided.

Topic notification may include automatic notification by the system that the start time to discuss a topic is drawing near, as determined by the system by tracking topic progress. Alternatively, a moderator can notify topic attendees that the start time to discuss a topic is drawing near. The benefit for attendees of the notification is that more efficient use is made of the participants' time. Participants do not need to sit through topics in which they have little interest, so that they do not miss some portion of the topic that they are interested in. This provides more efficient time management for the participants.

Identification of backup participants may refer to designation of a backup participant when a user leaves the conference. A participant can keep up a meeting context using a backup participant. A backup participant, for instance, may be someone who participates in decisions and studies, but who does not exercise a voting authority until and unless a primary participant is unable to participate. This is similar to the concept of alternate jurors at a trial. An advantage of designating backup participants is that if a primary participant is unable to continue participating, then there is less impact to the overall topic progress and schedule of other participants by usage of backup participants. The substitution of a backup participant may be by use of person who is already at the meeting (i.e., an internal request), or by use of a person not already at the meeting (i.e., an external request). There may be adopted various policies with respect to usage of backup participants, such as having multiple levels or layers of backup participants, setting a maximum number of backup participants that can be used, defining a policy whether participants who leave in favor of the backup participant can later rejoin, and so forth. These policies may be set in advance by the moderator, either with or without review and discussion by topic participants.

Dynamic agenda modification refers to a capability to introduce new topics in the agenda, defer topics, close out topics, or to cancel/discarded topics during a meeting, rearrange an order of presentation of topics, etc. Such actions may be undertaken by a person with sufficient privileges such as the moderator.

Embodiments in accordance with the present invention provide for the capability to have concurrent discussions, concurrent sub-sessions, and the like. The types of discussions that are amenable to being held concurrently, or the properties that they should have, include that the subject matter from one sub-session to another should be independent, i.e., the subject matter should not be dependent upon information developed within other sub-sessions or dependent upon decisions made at another sub-session. Another kind of concurrency occurs when sub-discussion groups are formed to address portions or aspects of a larger problem or objective. For example, a concurrency may be formed by stating that participants can go to any one of these three choices. However, if a user is given just a list of topics and the people required at each topic, the system may search for and/or extract concurrency.

Once concurrency is identified, the concurrency is utilized by first recognizing concurrent discussions based on the agenda. For example, there should be no overlapping quorum requirements between proposed concurrent discussions, and there should be no dependency in decision-making or data production between proposed concurrent discussions.

Second, concurrency is recognized by finding a set of candidate topics that is appropriate for concurrent scheduling. Considerations for such candidate topics include the number of topics that can be scheduled at the same time, and finding candidate topics that are scheduled to have about the same amount of time.

Embodiments in accordance with the present invention also include an ability to provide a meeting synopsis. The meeting synopsis may be, for instance, in the form of a meeting snapshot (i.e., a "peek" at the meeting status at a selected time), or an ability to provide a meeting history. The meeting history may involve, after the meeting is over, a process of merging the original agenda, the record of what actually happened (i.e., the "dynamics"), the attendance, and any notes taken into a complete history, which is often referred to as the "minutes" of the meeting.

Embodiments in accordance with the present invention may also allow invited participants to "peek" into the meeting to see the current status of the meeting. At physical meetings, a person might open the door and see a speaker standing to make his presentation, and know that the invited participant's portion is next. Embodiments in accordance with the present invention provide an electronic peek in order to electronically provide the current status of the meeting, and/or what topics have been discussed, attendance, upcoming agenda items, etc.

The meeting snapshot may provide a one-time view of the meeting status at a time selected by the user. The meeting status may include an indication of the progress of the meeting, so that the user can decide whether to join the meeting at that time. For example, a notification to a speaker may be of the form "you are due up in 5 minutes". In contrast, a snapshot provides a view of the current state of the meeting. The snapshot may also include one or more visual displays, such as a view of presentations being made to the meeting, or a webcam display of the proceedings, and so forth.

The meeting history may be assembled from a combination of one or more of the agenda, meeting dynamics, topic minutes, notes by a designated person such as a recording secretary, and so forth. The meeting dynamics may include a record of the actual meeting, such as a transcript of what was spoken, or an audio and/or visual recording. An advantage of a record of the actual meeting is that meeting dynamics (e.g., changes in the schedule, etc.) may become more apparent and therefore provide better background preparation to the person entering the meeting.

The meeting snapshot features support an ability to peek into an e-conference while the e-conference is in progress, in order to determine status or progress toward agenda items. The meeting history is complete only after the meeting is done. Such a peeking capability may be useful if a person wants to attend a portion of a meeting that is of interest to that person, but wants to lessen the amount of time spent attending other portions of the meeting devoted to other discussions having relatively less interest to the person. Embodiments in accordance with the present invention allow a person who is not presently attending or participating in a meeting to monitor or to obtain a snapshot view of the status of the meeting, in order to determine whether to enter the meeting, or to estimate when the person should enter the meeting, to periodically monitor progress of the meeting, and so forth. Such a snapshot view or monitoring may or may not be obtained anonymously, without the knowledge or observation by other participants in the meeting. An anonymous snapshot may be a matter of policy that may be parameterized. For example, whether only invitees are allowed to peek into a meeting, or can a supervisor of an attendee peek into the meeting. Anonymity may refer to a lack of notification of an unidentified peeker, or may extend to a lack of notification of the anonymous snapshot itself (e.g., attendees know someone peeked but not exactly who did so), or public. The choice may depend upon the contexts. An anonymous snapshot or monitoring may also be useful in situations where either the act of monitoring or not monitoring may influence behavior of meeting participants, such as that of a supervisor monitoring performance of a customer service representative in a meeting with a customer.

Peeking may be useful in certain conference contexts, such as an agenda-driven conference system. In a telephone-based system, for instance, after giving a security code in order to join a conference, a person may be offered a choice whether to join the conference or to monitor the conference in a peeking mode. Peeking may be implemented with a limited form of access, with the access controlled by a moderator. For example, peeking may provide only a limited view of what is going on in the meeting, peeking may not be anonymous, and peeking may be implemented in a listen-only mode. Contextual information may be provided (e.g., the number of present attendees, identification of key attendees presently attending, etc.) and the current position in a static agenda. Contextual information may be provided, for instance, by way of a text message, voice response system, access to a web page, and so forth.

When a conference is initially organized, embodiments in accordance with the present invention may provide an invitation to participants. The invitation may contain a first link that allows the user to join into the conference as a fully participating member. The invitation may also contain a second link that allows the user to "peek" into the conference, to determine its current status. When the user clicks on the link, the user's peeking privileges will be verified by the agenda server. The result of the peek is a snapshot of the conference that may include at least one or more of the following: (a) What topics have already been discussed, and the discussion time devoted to each topic; (b) What topics have yet to be discussed, and the estimated times at which they will be discussed and/or their estimated durations; (c) What topics are ready to be discussed as soon as this participant joins; and (d) A list of attendees that are currently attending or have attended the meeting.

Alternative embodiments in accordance with the present invention may provide one or more of the following options, choices, abilities, parameters controllable during real-time, and so forth, as denoted or allowed or enabled by the person's peeking privileges: (a) an optional and controllable ability to limit the number of peeks that a person may use, which may be useful for sensitive topics; (b) Whether or not other conference members are informed of a person joining in a peeking mode; (c) Whether or not other conference members are informed of the identity of a person joining in peeking mode; (d) Should the peeker be allowed full or partial access, for instance by restricting access to only topics of interest to the peeker; (e) Should the peeker see the complete attendance, or just people related to his topics; (f) Is peeking permitted for all participants, or only for a participants having sufficient privilege. Full or partial access may be denied to persons who are not authorized to peek at the conference.

Embodiments in accordance with the present invention, in providing peeking, provide a method for monitoring an electronic meeting, such that the electronic meeting is conducted among remotely-located users via one or more communication links with an agenda server, in which the method includes receiving a peek request from a remotely-located user; verifying a peek privilege of the remotely-located user; and providing a status of the electronic meeting based upon the peek privilege. The status of the electronic meeting may include one or more of: a list of covered topics and a respective duration of the covered topics; a list of topics not covered and a respective estimated duration of the topics not covered; a list of topics to be covered if the remotely-located user joins the electronic meeting; an attendance list; and a list of covered topics and a respective duration of the covered topics The peek privilege, in accordance with an embodiment of the present invention, may include one or more of: a controllable limit on the number of peeks that the remotely-located user may use; an indication whether to inform other conference members of the remotely-located user peeking in the electronic meeting; an access level of the remotely-located user; and a permission level to access an attendance list.

FIG. 1 illustrates a schematic view of system 100 in accordance with an embodiment of the present invention. System 100 includes: an agenda server 102; a conferencing application 104 that is accessible electronically, such as OpenMeetings or other client/server conferencing application accessible via the internet; a web browser used to access a multimedia development tool 106 such as OpenLaszlo; and a database 108, which are functionally interconnected as shown. Database 108 may be physically separate from agenda server 102, or may be incorporated in data storage within agenda server 108.

Agenda server 102 retrieves information related to agenda 110 via REpresentational State Transfer ("REST") services. Agenda server 102 prepares an agenda view 112, for instance by use of a Java applet, which is then displayed by use of multimedia development tool 106. Agenda server 102 further exchanges information, via flash XML socket, with multimedia development tool 106 in order to prepare and/or display a list of events 114. Online conferencing application 104 communicates with agenda server 102 in order to create and manage the room/invitation list 116. Invitation list 116 may be, for example, a list of participants for the meeting and a list of participants for each agenda item. The interface between online conferencing application 104 and agenda server 102 may be via Simple Object Access Protocol ("SOAP"), which is known as a protocol specification for exchanging structured information in the implementation of Web Services in computer networks. SOAP relies on Extensible Markup Language (XML) for its message format. Online conferencing application 104 further communicates with multimedia development tool 106 via HTTP messages, in order to produce meeting view 118.

As the meeting progresses, progress toward agenda items is noted using multimedia development tool 106. Meeting status as maintained by agenda server 102 is updated, and updated agenda views 112 and meeting views 118 are made available.

Figure 2:
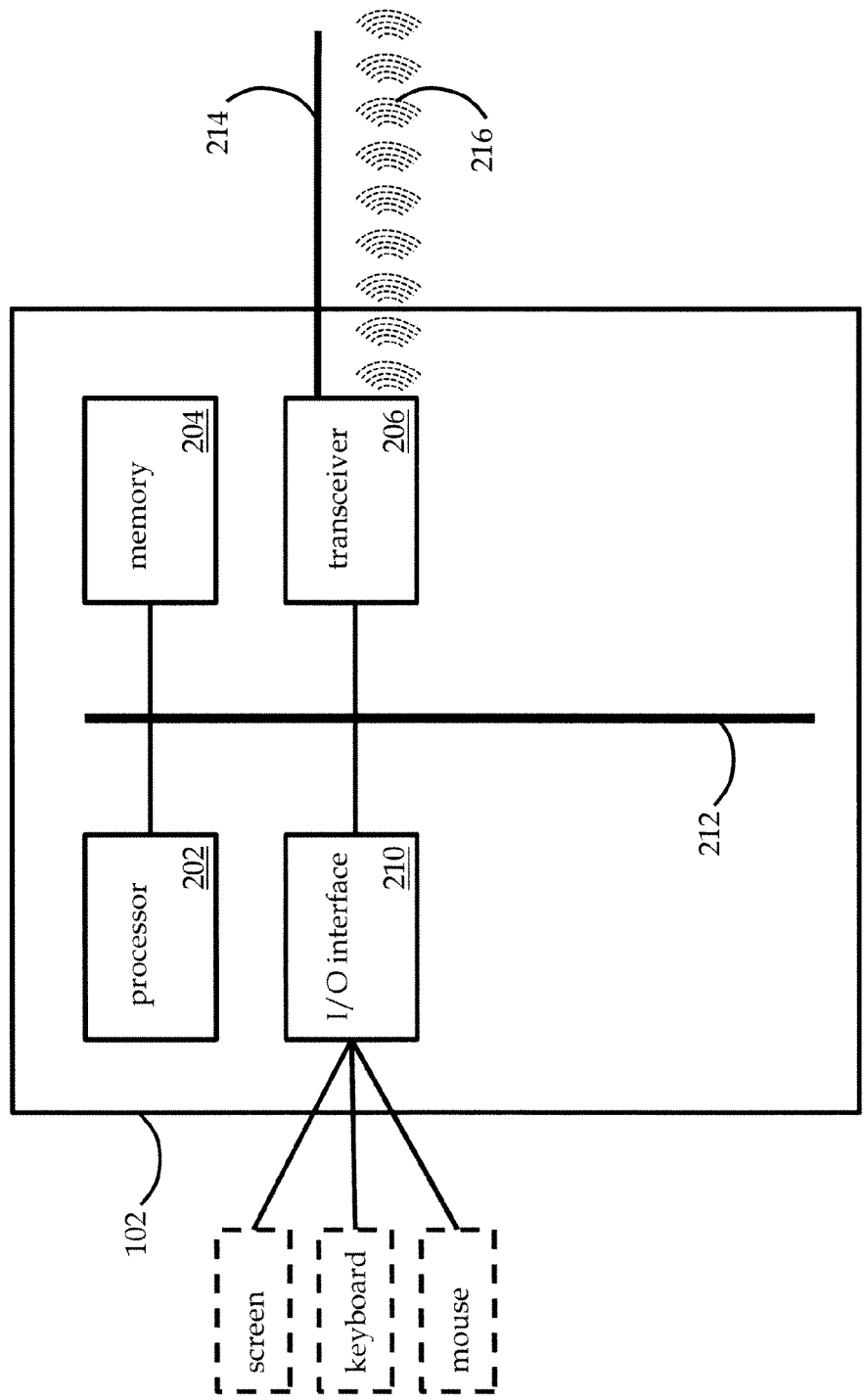
FIG. 2 illustrates an architecture for an agenda server in accordance with an embodiment of the present invention.

FIG. 2 illustrates an architecture for agenda server 102. Agenda server 102 may include a processor 202, a memory 204 coupled to the processor, a receiver, transmitter, transceiver 206, and/or I/O interfaces 210. Transceiver 206 couples agenda server 102 to an internal and/or external communication path such as an Ethernet connection 214 or an optional RF connection 216. RF connection 216 may be WiFi, Bluetooth, ZigBee, UWB, or similar technologies used for RF networking. I/O interfaces 210 couple agenda server 102 to one or more optional user input/output (I/O) devices (e.g., display screen, keyboard, mouse, etc.). Memory 204 stores data and/or program instructions used by processor 202. Memory 204 may include permanent, non-volatile memory (e.g., ROM), or volatile memory (e.g., RAM), or rewritable memory (e.g., hard drive or flash memory), or any combination thereof. For instance, memory 204 may include database 108 depicted in FIG. 1. Components of agenda server may be interconnected by communication path 212. The program instructions, when executed by processor 202, carry out the processes performed by agenda server 102.

Figure 3:
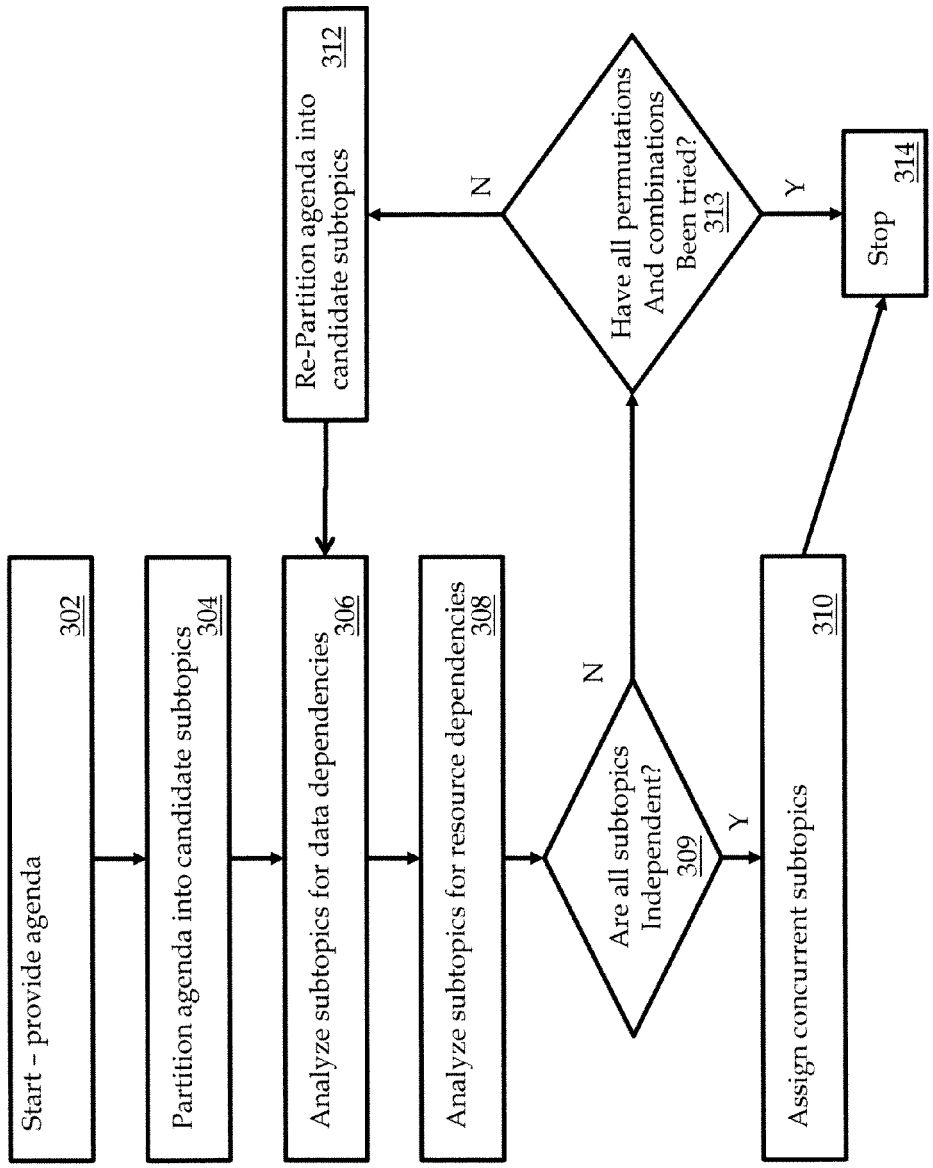
FIG. 3 illustrates a method for identifying and implementing concurrent e-meetings in accordance with an embodiment of the invention.

FIG. 3 illustrates a method 300 for identifying and implementing concurrent e-meetings. Method 300 starts at step 302, in which an agenda is provided.

At step 304, the agenda is partitioned into proposed candidate subtopics. Subtopics may be identified by a moderator or someone of sufficient privilege, or may be based on a template or a past similar meeting.

At step 306, the proposed subtopics are analyzed for data dependencies. For example, if two proposed subtopics are not mutually dependent upon data arising from the other, or decisions made in the other, then those proposed subtopics are candidates for concurrency.

At step 308, the proposed subtopics are analyzed for resource dependencies or conflicts. For instance, if a key decision-maker needs to participate in two different subtopics, then those subtopics are not candidates for concurrency.

At step 309, a decision is made on the basis of the analysis from step 308. If all proposed subtopics are independent, then control passes to step 310. If not all proposed subtopics are independent, then control passes to step 313.

At step 310, proposed subtopics are assigned to be conducted concurrently, and process 300 concludes at step 314.

At step 313 a decision is made whether all possible permutations and combinations have been made without finding sets of subtopics that can be discussed concurrently. This may occur if the meeting is so intertwined that it cannot be conducted concurrently. In that situation, the meeting agenda may revert to a non-concurrent form, and the process will stop at step 314. If not all possible permutations and combinations have yet been made, then control passes to step 312.

At step 312, the agenda is repartitioned into a different grouping of proposed subtopics, and control passes to step 306.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the present invention to the precise form disclosed. Modifications and variations are possible in light of the above teachings or may be acquired from practice of the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any" combination of multiples of the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A system for implementing an electronic meeting, wherein the electronic meeting is conducted among remotely-located users via one or more communication links, comprising:
    an agenda server, comprising a processor and a memory coupled to the processor, the memory configured to store instructions that when performed by the processor implement the steps of:
        accepting, by the agenda server, a meeting agenda comprising: a plurality of topics; an identification of resources used by each topic; an identification of data used by each topic; an identification of a quorum for each topic; and an identification of data produced by each topic;
        assigning topics to at least a first group of topics and a second group of topics, such that data dependencies and resource dependencies between the first group of topics and the second group of topics are reduced below a predetermined dependency threshold;
        concurrently scheduling the first group of topics and the second group of topics;
    a communication interface to a conferencing application server; and
    a communication interface to a remotely-located user.

2. The system of claim 1, wherein the memory is further configured to store instructions that, when performed by the processor, assign topics to groups such that a duration of the first group of topics is within a predetermined length of time of a duration of the second group of topics.

3. The system of claim 1, wherein the memory is further configured to store instructions that, when performed by the processor, invite a person to participate electronically in a topic as a resource.

4. The system of claim 3, wherein an invitation to the person comprises an indication of a requiredness of the person.

5. The system of claim 3, wherein the memory is further configured to store instructions that, when performed by the processor, monitor, by the agenda server, a level of participation by the person in the electronic meeting.

6. The system of claim 3, wherein the memory is further configured to store instructions that, when performed by the processor, monitor, by the agenda server, a dynamic quorum of the electronic meeting.

7. The system of claim 3, wherein the memory is further configured to store instructions that, when performed by the processor, provide, by the agenda server, a capability to allow an invited person to peek at a status of the electronic meeting.

8. The system of claim 1, wherein data dependencies comprise a datum resulting from the first group of topics, wherein the datum is used by the second group of topics.

9. The system of claim 1, wherein data dependencies comprise a decision resulting from the first group of topics, wherein the decision is used by the second group of topics.

10. The system of claim 1, wherein the memory is further configured to store instructions that, when performed by the processor, perform the steps of:
   monitoring a progress of the electronic meeting in addressing a topic; and
   presenting an indicator of the progress to remotely-located users via the one or more communication links with the agenda server.

\* \* \* \* \*